Dec. 15, 1970

F. H. SHIGEMOTO

3,547,540

LASER FLUID VELOCITY DETECTOR

Filed Dec. 15, 1967

*INVENTOR.*
FRED H. SHIGEMOTO

BY
ATTORNEYS

United States Patent Office 3,547,540
Patented Dec. 15, 1970

3,547,540
LASER FLUID VELOCITY DETECTOR
Fred H. Shigemoto, San Jose, Calif., assignor to the United States of America as represented by the Administrator of the National Aeronautics and Space Administration
Filed Dec. 15, 1967, Ser. No. 690,997
Int. Cl. G01c 3/08
U.S. Cl. 356—28          12 Claims

ABSTRACT OF THE DISCLOSURE

A method and apparatus for measuring the velocity of a moving fluid, or the like, including a laser or like source of a beam of coherent electromagnetic radiation to illuminate particulate matter in the moving fluid. Light scattered in the flow is collected at two points located at different viewing angles, which light then is superimposed at the surface of a photodetector. The frequency of the scattered light is Doppler shifted from that of the laser beam as a result of the movement of the fluid and, since the scattered light is viewed at different viewing angles, the Doppler shift is different for the two light collectors. The difference frequency of the two Doppler frequencies is produced at the output of the photodetector which difference frequency is proportional to the velocity of the moving fluid. An indication of the difference frequency is obtained by feeding the output from the photodetector to a frequency detector such as a spectrum analyzer, oscilloscope, or the like, which may be calibrated in terms of velocity.

---

This invention described herein was made by an employee of the United States Government and may be manufactured and used by or for the Government for governmental purposes without the payment of any royalties thereon or therefor.

This invention relates to a method of an apparatus for the measurement of velocity of moving objects and more particularly to such method and apparatus employing the Doppler shift of a laser beam, or the like, used to illuminate the moving objects.

The invention is well adapted for the measurement of fluid flow and is described hereinbelow for such use. However, it is not limited to such use and, as will become apparent, the invention may be used to determine the velocity of diffusely reflecting objects of any suitable type.

Numerous methods of measuring fluid flow velocities are known which methods include the use of electron beams, laser beams, gamma rays, X-rays and the like. Some prior art methods require physical contact with the moving fluid, or the addition of particulate matter thereto. Some prior art methods require that the detecting apparatus be exposed to radiation for long periods of time or be subjected to pressure limitations. Also, prior art laser methods which utilize a reference source to mix with the laser scatter light from particulate matter in a fluid are known but are not feasible where backscatter light is employed because of cancellation of signals due to phase differences between particles.

An object of this invention is the provision of a method and means for determining the velocity of fluid flow by use of laser radiation which avoids the above-mentioned shortcomings of prior art methods and means.

An object of this invention is the provision of a method and means of detecting the velocity of a fluid from either the forward or backscattered laser radiation.

An object of this invention is the provision of a method and apparatus for determining the velocity of fluid with backscattered energy from the fluid which is illuminated by coherent radiation at or near the optical frequency range.

The invention comprises a method and means of determining the velocity of moving reflecting objects by illuminating the objects by a beam of coherent electromagnetic radiation, and detecting the Doppler shifted radiation scattered from the objects from two different viewing angles symmetrically positioned about the beam. The difference frequency between the Doppler shifted scattered radiation is determined, which difference frequency is related to the component of velocity of the moving objects normal to the transmitted beam. By locating the radiation collectors symmetrically about the beam, cancellation effects due to phase differences between particles simultaneously illuminated are eliminated.

The above and other objects and advantages will become apparent from the following description when read in conjunction with the accompanying drawings. In the drawings, wherein like reference characters refer to the same parts in the several views.

Figure 1:
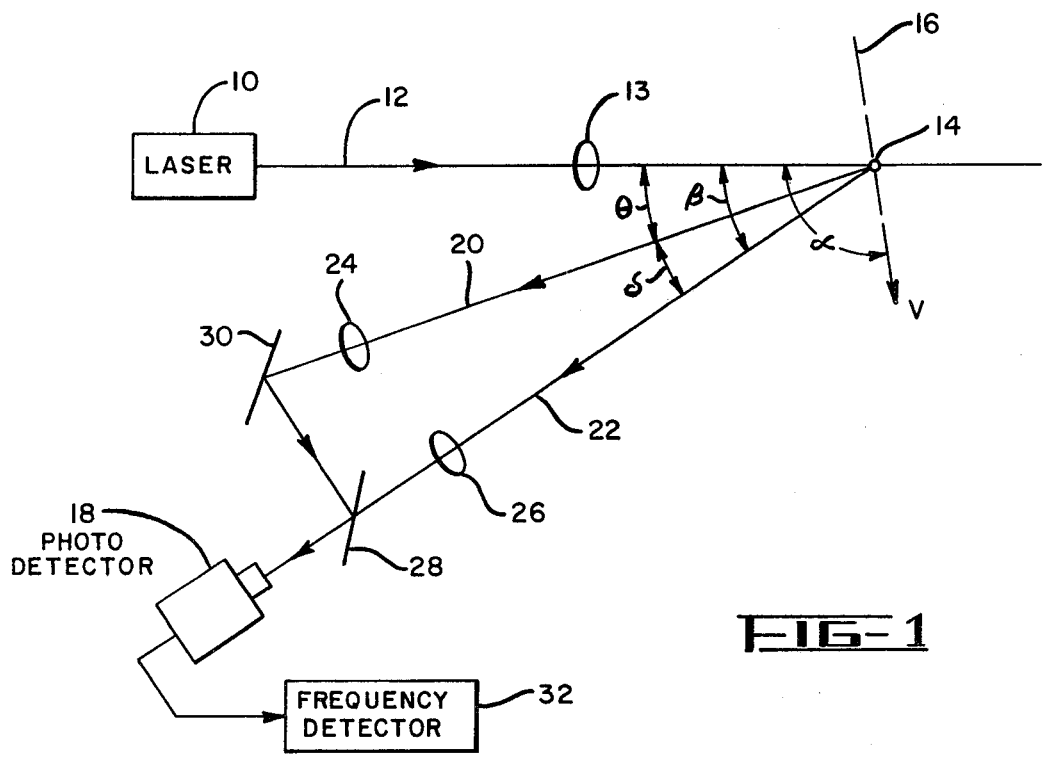
FIG. 1 is a diagram of a velocity detector arrangement which diagram is used to facilitate an explanation of the invention.

Reference is first made to FIG. 1 of the drawings wherein a velocity detector is shown comprising a source 10 of coherent electromagnetic radiation operating at or near the optical frequency range. In particular the source may comprise a continuous or pulsed laser system including suitable lenses, and the like, for directing the radiant beam 12 onto the moving objects to determine the velocity thereof. In FIG. 1, a single particle 14 is shown travelling along path 16 at an angle α to the laser line of sight. The particle 14 may comprise, for example, a single particle included in a fluid flowing in the direction of the arrow 16. In practice, a plurality of such particles 16 would be illuminated by the beam and not a single particle as illustrated in FIG. 1. The laser beam preferably is focused on the fluid stream as by a lens 13 to provide highly localized backscatter.

In accordance with this invention, the radiation scattered in the flow is viewed from slightly different angles, which radiation is then superimposed at the surface of a detector 18 such as a photocell. In FIG. 1, the two viewing angles, as measured from the laser beam 12, are designated β and θ, respectively, and the angular difference therebetween is designated δ. The two backscattered beams are identified by the reference numerals 20 and 22, respectively. The frequency of the two beams 20 and 22 is Doppler shifted from that of the laser output frequency by reason of the velocity of the particle 14. The amount of Doppler shift not only depends upon the velocity of the particle 14, but also upon the angle from which the particle is viewed. In the arrangement shown in FIG. 1, the frequency of both beams 20 and 22 is increased, with the beam 22 experiencing a greater frequency shift than that of the beam 20 because of the illustrated configuration.

Objective lenses or lens systems 24 and 26 are included in the beam paths 20 and 22, respectively, for focusing the scattered beams onto the face of the detector 18. The beam 22 is directed onto a semi-transparent mirror 28 whereby a portion thereof passes through the mirror and onto the detector 18. The beam 20 is reflected by a plane mirror 30 and is directed onto the semi-transparent mirror 28 from whence a portion thereof is reflected onto the photodetector 18. For optimum superposition of images the optical magnifications thereof are made equal, that is, the ratios of object to image distance are the same. As a result, particle images at the photodetector 18 remain superimposed for a maximum time. This condition is necessary for photomixing which requires the wave fronts of the two beams to be plane and parallel at the detector 18 in order to avoid a variation in phase of the difference frequency signal over the photodetector surface.

The detector may comprise a photoelectric cell of any well known type including photoemissive, photovoltaic and photoconductive types, all of which have a square-law light versus output characteristic. In practice a photomultiplier is preferred because of its broad frequency response and large amplification. The different frequency beams 20 and 22 produce signals which are mixed at the photocell, whereby the output from the photocell includes a periodic signal having a frequency equal to the difference frequency of the beams 20 and 22. The photocell output may be amplified by a suitable difference frequency amplifier, not shown, and then fed to a suitable frequency detector 32 to determine the frequency of the difference frequency signal. The frequency detector 32 may comprise, for example, an oscilloscope, a frequency spectrum analyzer, or the like.

Considering the configuration of FIG. 1, the difference in particle velocity as viewed along beams 20 and 22, for a particle travelling at a velocity $V$ at an angle $\alpha$ with respect to the direction of laser propagation may be obtained; the difference in particle velocity as seen from the two viewing angles $\theta$ and $\beta$ being required to evaluate the frequency difference signal designated $F_d$. The component of particle velocity along the beam 20 is $V \cos(\alpha-\theta)$ and that along the beam 22 is $V \cos(\alpha-\beta)$. The differential velocity then is, $$V_{22}-V_{20}=V[\cos(\alpha-\beta)-\cos(\alpha-\theta)] \quad (1)$$

Expanding Equation 1, substituting trigonometric identities, and simplify, the following expression for $V_{22}-V_{20}$ is obtained:

$$V_{22}-V_{20}=2V \sin \tfrac{1}{2}(\beta-\theta) \sin [\alpha-\tfrac{1}{2}(\theta+\beta)] \quad (2)$$

It may be readily shown that the difference between the two Doppler frequencies of the beams 20 and 22, termed the difference frequency, $F_d$, for the FIG. 1 configuration is, $$F_d=\frac{2(V_{22}-V_{20})}{\lambda} \quad (3)$$

where $\lambda$ is the wavelength of the optical beam 12. Substituting Equation 2 into Equation 3 the difference frequency is, $$F_d=\frac{4V}{\lambda} \sin \tfrac{1}{2}(\beta-\theta) \sin [\alpha-\tfrac{1}{2}(\theta+\beta)] \quad (4)$$

From Equation 4 it is seen that the difference frequency is directly related to the velocity, V, of the particle 14, and more particularly to the velocity component normal to the bisector of the angle subtended by the beams 20 and 22.

Figure 2:
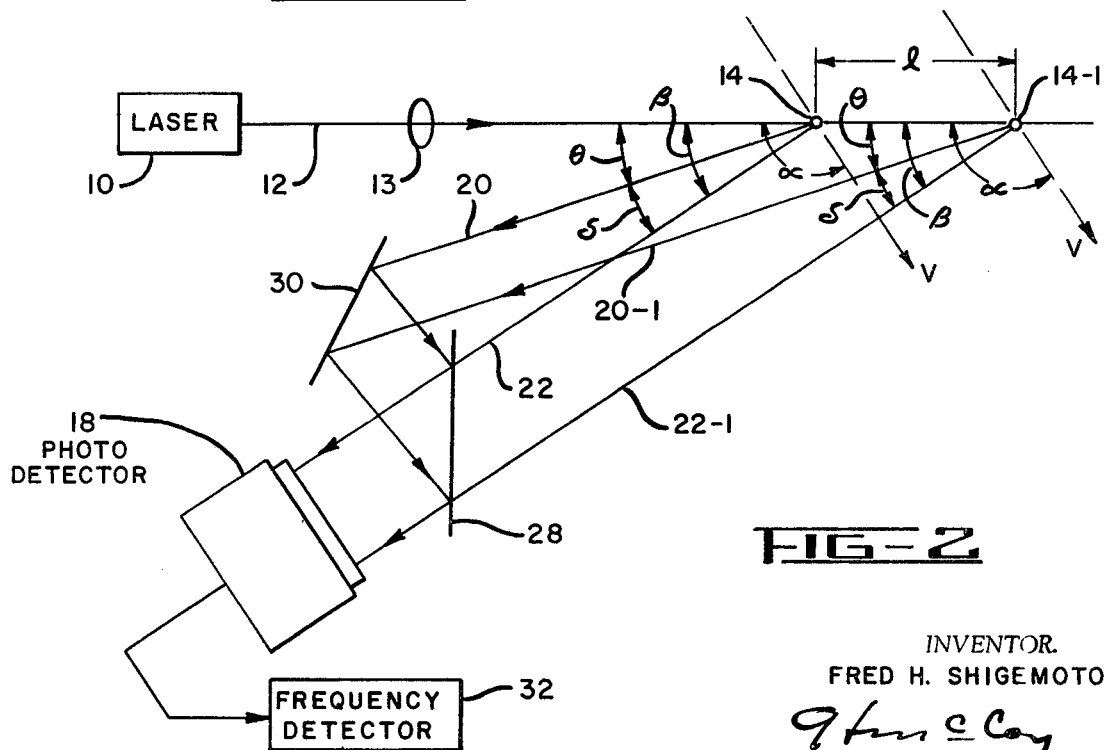
FIG. 2 is a diagram which is similar to that of FIG. 1 but showing the optics when light is scattered from two particles travelling with the same velocity in the fluid stream.

As mentioned above, a disadvantage of prior art laser techniques for detecting velocity is that a phase problem exists which makes detection of the frequency shift from the backscattered laser light difficult. In general, prior art laser methods of detecting fluid velocity which utilize a reference source to mix with the laser backscattered light from particulate matter in a fluid have a problem of signal cancellation due to phase differences between particles. With the arrangement of this invention signal cancellation due to phase differences between particles is avoided. This is best illustrated by consideration of the two particle, two dimensional arrangement shown in FIG. 2, to which figure reference is now made. There, the two particles illuminated by the laser beam are designated 14 and 14-1, which particles are shown separated by a distance $l$. Since the particles 14 and 14-1 travel at the same speed, it will be apparent that the difference frequency, $F_d$, for one particle is the same as that for the other particle. However, due to the optical path differences, the difference frequencies differ in phase. This phase difference in the configuration of FIG. 2, is equal to $$k l (\cos \theta - \cos \beta) \quad (5)$$

wherein;

$k=2\pi/\lambda$, and
$\lambda$ = wavelength of the laser beam 12.

The resultant difference frequency signal is equal to the sum of the scattered light from each particle. The photomixed difference frequency signal from particle 14 is given in Equation 4 above. The expression for the second particle 14-1 differs from Equation 4 by the phase factor $kl(\cos \theta - \cos \beta)$ (expression (5) above). An expression for the total photomixed difference frequency signal is, $$F_d \approx \cos kV(\cos \theta - \cos \beta)t + \cos [kV(\cos \theta - \cos \beta)t + kl(\cos \theta - \cos \beta)] \quad (6)$$

where the symbols are as identified above and in the drawing FIG. 2.

Assuming that the amplitude of the radiation backscattered from each particle is equal, then the resultant, or total, difference frequency signal amplitude will be zero for $$kl(\cos \theta - \cos \beta) = n\pi \quad (7)$$

where $n$ is an odd integer. Letting $\delta = \beta - \theta$ and solving for $l$, the condition for zero amplitude reduces to the following equation:

$$l = \frac{n\lambda}{4 \sin \left(\theta + \frac{\delta}{2}\right) \sin \frac{\delta}{2}} \quad (8)$$

Figure 3:
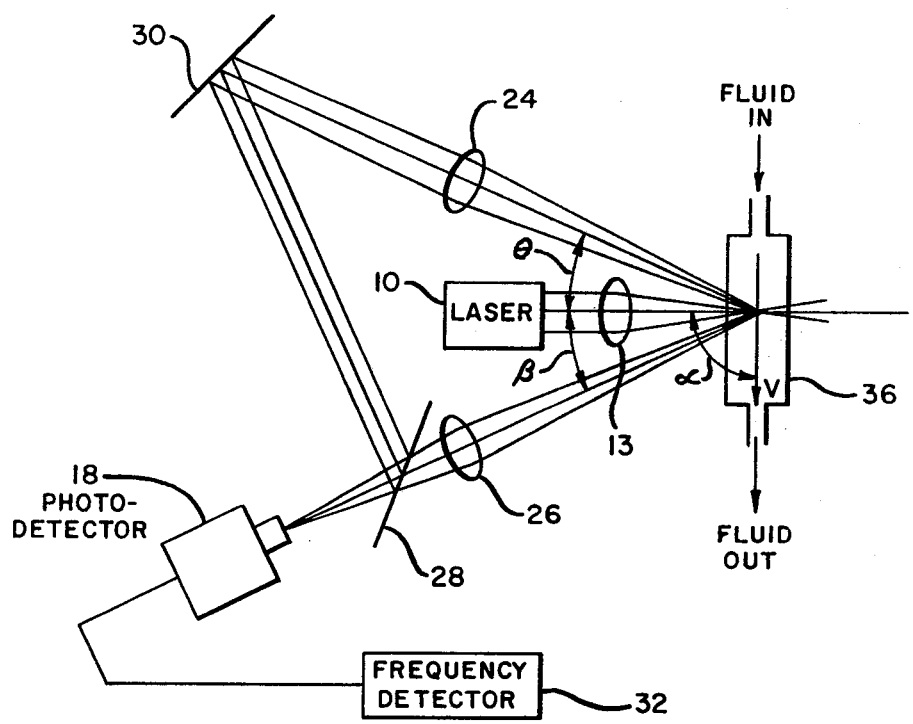
FIG. 3 is a diagram of a velocity detector showing the receiver optics symmetrically located about the laser line of sight, which detector embodies this invention.

Now then, if the receiver optics are placed symmetrically about the laser line of sight to view forward scatter, wherein $$\beta = \pi + \frac{\delta}{2} \text{ and } \theta = \pi - \frac{\delta}{2}$$

or to view backscatter (as illustrated in FIG. 3) wherein $$\theta = -\frac{\delta}{2} \text{ and } \beta = \frac{\delta}{2}$$

the condition for cancellation in Equation 8 allows $l$ to approach infinity. This condition indicates that for the many-particle situation the difference frequency signal amplitude is independent of the spatial distribution of the particles in the volume viewed and consequently detection of this signal is feasible. That is, with the symmetrical arrangement of the receivers about the laser line of sight, cancellation effects do not occur and the amplitude of the signal varies directly as the number of particles viewed and is independent of the spatial distribution of the particles. The difference frequency is proportional to the velocity difference as seen from the slightly different viewing angles. An expression for the velocity difference, $\Delta V$ is:

$$\Delta V = 2V \sin \frac{\delta}{2} \sin \left[\alpha - \left(\theta - \frac{\delta}{2}\right)\right] \quad (9)$$

The difference frequency is;

$$F_d = \frac{2\Delta V}{\lambda} \quad (10)$$

Substituting the expression for $\Delta V$ from Equation 9 into Equation 10 it is seen that the difference frequency is directly related to the flow velocity, V, to provide a direct indication thereof. It will be apparent that the measurement technique is insensitive to the velocity components in the direction of the laser propagation, and is most sensitive to velocities normal to the laser line of sight.

In the arrangement shown in FIG. 3 a fluid (such as gas) which contains optical scattering particles (such as smoke) is passed through a chamber 36 of light transparent material along a path normal to the laser beam line of sight. (That is, $\alpha = 90°$.) The beam 12 is focused upon the travelling fluid by a focusing lens 13 and the lenses 28 and 26 for viewing the back-scattered light from different viewing angles are symmetrically positioned about the laser beam. (That is, $\theta = -\beta$.) With this arrangement the frequency of the beam through the lens 24 is Doppler shifted by an amount equal to the Doppler shift of the beam through the lens 26, the one shift being to a decreased frequency and the other being to an increased frequency. With this arrangement the entire device may be self-contained, i.e., the light transmitter and receivers may be contained in a single package at one location. Unlike prior art arrangements, detection of fluid velocity from backscattered laser light is effected without the problem of signal cancellation due to phase differences between particles.

The invention having been described in detail in accordance with the requirements of the Patent Statutes, various changes and modifications may suggest themselves to those skilled in this art. For example, the optics may be symmetrically placed about the laser line of sight to view forwardscattered, rather than backscattered light. Also, the detector is not limited to use with fluids, but can be used to determine the velocity of diffuse reflecting objects. For example, the invention may be used for the detection of air velocity in wind tunnels, relative air speed of aircraft, cloud velocity, panel flutter, calibration of pressure transducers, and other applications where knowledge of particle flow is desired. It is intended that the above and other such changes and modifications should fall within the spirit and scope of the invention as defined in the appended claims.

I claim:

1. The method of determining the velocity of reflecting objects travelling at the same speed along parallel paths, said method comprising,
    transmitting a beam of continuous coherent electromagnetic radiation onto the moving objects,
    collecting Dopper shifted radiation scattered from the objects from two points located at different angular positions from the beam, and
    obtaining a signal related to the frequency difference of the Doppler shifted radiation at the two points, which signal is related to the component of velocity of the objects normal to the bisector of the angle between the collected Doppler shifted radiation.

2. The method of determining the velocity of moving reflecting objects travelling at the same velocity along parallel paths, comprising,
    transmitting a beam of coherent electromagnetic radiation onto the moving reflecting objects,
    collecting Doppler shifted radiation scattered from the objects at two points symmetrically located about the transmitted beam of radiation and determining the difference in frequency between the Doppler shifted radiation at the two points,
    the difference frequency being related to the component of velocity of the moving objects normal to the transmitted beam.

3. The method of determining the velocity of moving reflecting objects as defined in claim 2 wherein the difference in frequency between Doppler shifted radiation at the two points is determined by directing the radiation onto a photodetector having a square-law characteristic.

4. The method of determining the velocity of moving reflecting objects as defined in claim 3 including supplying the output from the photodetector to a frequency detector to detect the difference frequency.

5. The method of determining the velocity of moving reflecting objects as defined in claim 2 wherein said objects comprise particulate matter included in a fluid flow.

6. The method of determining the velocity of moving reflecting objects as defined in claim 2 wherein backscattered Doppler shifted radiation is collected.

7. The method of determining the velocity of moving reflecting objects as defined in claim 2 wherein forward scattered Doppler shifted radiation is collected.

8. The method of determining the velocity of moving reflecting objects as defined in claim 2 wherein the beam of radiation is a laser beam in which the beam axis is normal to the direction of travel of the moving objects.

9. A system for determining the velocity of moving reflecting objects comprising,
    a source of coherent electromagnetic radiation for directing a beam of radiation onto the moving reflecting objects,
    first and second radiation collecting means symmetrically positioned about the axis of the beam for collecting Doppler shifted radiation scattered from the moving objects, and
    means for determining the difference in frequency between the collected Doppler shifted radiation, which difference frequency is related to the component of velocity of the objects normal to the beam axis.

10. The system for determining the velocity of moving reflecting objects as defined in claim 8 wherein,
    said source of radiation comprises a laser having a beam directed onto a flow of fluid which includes the reflecting objects.

11. The system for determining the velocity of moving reflecting objects as defined in claim 9 wherein,
    said means for determining the difference in frequency between the collected Doppler shifted radiation includes,
        a photodetector upon which the collected Doppler shifted radiation is superimposed, and
        a frequency detector for detecting the difference frequency from the output of the photodetector.

12. The system for determining the velocity of moving reflecting objects as defined in claim 9 wherein the axis of the beam of radiation from the source is normal to the direction of travel of the moving reflecting objects.

References Cited

UNITED STATES PATENTS 3,032,758    5/1962    Stavis _____ 343—8

RODNEY D. BENNETT, JR., Primary Examiner

J. G. BAXTER, Assistant Examiner

U.S. Cl. X.R.

343—8